United States Patent
Polo Moragon et al.

(10) Patent No.: US 9,419,969 B2
(45) Date of Patent: Aug. 16, 2016

(54) METHOD AND SYSTEM FOR GRANTING ACCESS TO A SECURED WEBSITE

(75) Inventors: Javier Polo Moragon, Yecla (ES); Tomas Brezmes Llecha, Barcelona (ES)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/004,119

(22) PCT Filed: Mar. 9, 2012

(86) PCT No.: PCT/EP2012/054075
§ 371 (c)(1),
(2), (4) Date: Sep. 9, 2013

(87) PCT Pub. No.: WO2012/120106
PCT Pub. Date: Sep. 13, 2012

(65) Prior Publication Data
US 2013/0347071 A1  Dec. 26, 2013

(30) Foreign Application Priority Data
Mar. 10, 2011 (EP) .................................. 11305264

(51) Int. Cl.
| | |
|---|---|
| G06F 7/04 | (2006.01) |
| H04L 9/32 | (2006.01) |
| G06F 21/00 | (2013.01) |
| H04L 29/06 | (2006.01) |
| G06F 21/31 | (2013.01) |

(52) U.S. Cl.
CPC ............ *H04L 63/0853* (2013.01); *G06F 21/31* (2013.01); *H04L 63/08* (2013.01); *H04L 63/083* (2013.01); *H04L 63/10* (2013.01); *H04L 63/20* (2013.01)

(58) Field of Classification Search
CPC ......... H04L 63/08; H04L 63/10; H04L 63/20; H04L 63/083; G06F 21/31
USPC ........................... 726/3, 4; 713/168, 182, 184
See application file for complete search history.

(56) References Cited

U.S. PATENT DOCUMENTS

| | | | |
|---|---|---|---|
| 2003/0135588 A1 | 7/2003 | Bouthors | |
| 2009/0070351 A1* | 3/2009 | Klug et al. | ..................... 707/100 |
| 2012/0144461 A1* | 6/2012 | Rathbun | ................ H04L 9/3213 726/5 |

OTHER PUBLICATIONS

International Search Report and Written Opinion dated May 15, 2012 for corresponding International Application No. PCT/EP2012/054075 filed Mar. 9, 2012, 10 pages.

* cited by examiner

*Primary Examiner* — Aravind Moorthy
(74) *Attorney, Agent, or Firm* — David D. Brush; Westman Champlin & Koehler, P.A.

(57) ABSTRACT

A method and system are provided for granting access to a secured website of a content provider. The method includes: detection of a user's request for accessing secured website on a first communication device, the request indicating that at least one access code for accessing secured website is stored on an authentication server; transmission of a request for a validation to a second communication device identified with indication; and after verification of the validation received from the second communication device, forwarding the request for access to the secured website to the content provider using the stored website access code corresponding to the security code.

13 Claims, 2 Drawing Sheets

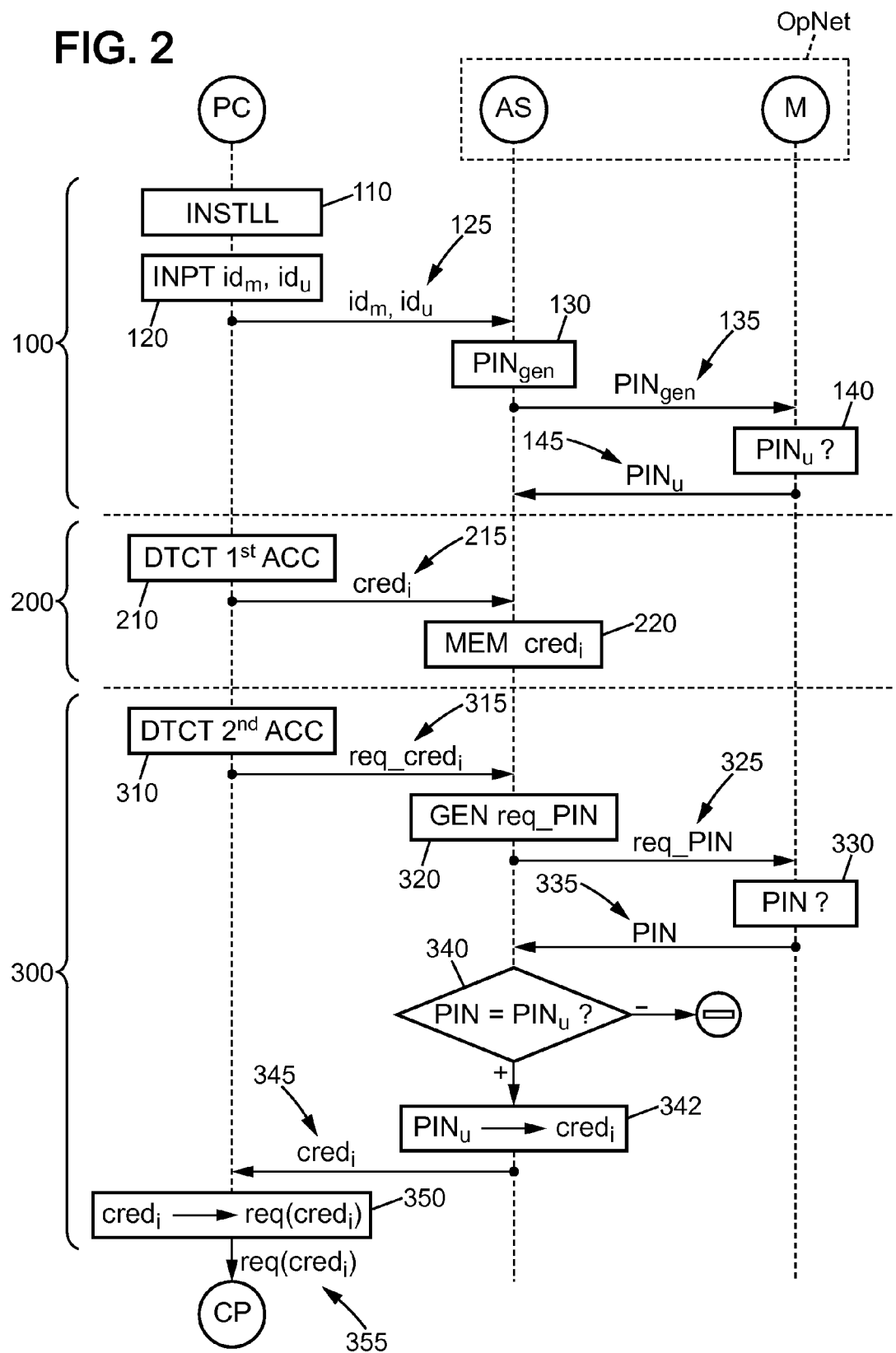

METHOD AND SYSTEM FOR GRANTING ACCESS TO A SECURED WEBSITE

CROSS-REFERENCE TO RELATED APPLICATIONS

This Application is a Section 371 National Stage Application of International Application No. PCT/EP2012/054075, filed Mar. 9, 2012, which is incorporated by reference in its entirety and published as WO 2012/120106 on Sep. 13, 2012, in English.

FIELD OF THE INVENTION

The present invention relates to the field of secure access to websites on internet and in particular to the field of credentials and authentication management for granting such a secure access.

BACKGROUND OF THE INVENTION

Internet users need to keep track of numerous passwords and user names associated each time to more and more internet services (email, social networks, personal areas on web sites banking accounts, chats, personal web sites, etc.). The secure storage of these users' credentials has become a critical issue with the development of internet.

So far, the most common solutions for managing such credentials can be categorized in the following groups:

Web Browser Credential Storing Management:

All current web browsers provide password protected key store and auto fill mechanisms. However, the large number of vulnerabilities detected on these systems advice against their use.

Operating System Native Credential Management:

Up to now, only UNIX based operating systems offers safe mechanisms for users credential custody. However, at the moment, the usage of these Unix based Operating System is much less spread that the usage of Windows systems. Besides, Unix based Operating Systems also present the intrinsic problem that they can only be used by a single user per session and computer, thus preventing the use of such solutions for shared computers and cloud computing environments.

Dedicated Applications for Password Managing Tasks:

These applications typically store all users' credentials in a cipher and encrypted file in the PC protected by a single password. However, this type of solution is also vulnerable as the credentials can be stolen and manipulated if the PC is hacked.

Method for Authenticating User Based on Authentication Server:

Such a method requires a network interface unit capable of communicating with computing devices sending and receiving the authentication requests. This method requires also to communicating authentication information from the user a storage unit for the users credentials and profiles and the authentication which analyze the authentication information.

The effectiveness in terms of authentication security is rather high with this last method but it unfortunately has the drawback of requiring special modifications in the websites in order to allow communicating with network interfaces, thus rendering difficult a mass market adoption of this type of method.

Therefore, although the internet industry has constantly tried to provide safer methods for user credentials storage and custody, none of the current solutions can offer the expected level of security.

SUMMARY OF THE INVENTION

The present invention proposes a method for granting access to a secured website of a content provider, said method comprising the steps of:

detecting a user's request for accessing a secured website on a first communication device, this request indicating that at least one access code for accessing the secured website is stored on an authentication server;

sending a request for a validation to a second communication device identified with this indication; and after verification of a validation received from the second communication device, forwarding the request for access to the secured website to the content provider using the stored website access code corresponding to the security code.

Request for validation sent to the second communication device can be done by several methods. It can be as simple as an acknowledgement of the request by the user or on the contrary can be implemented with a request for a security code. In all cases, the Authentication Server will verify the validation, either by insuring that an OK was received or by verifying the security code.

In an embodiment of the present invention, the method further comprises the steps of detecting the access code on the first communication device when the user requests for the first time to access the secured website and storing the access code on the authentication server, in order to provide an automatic storing of the access code on a remote authentication server.

Advantageously, the method further comprises the step of indicating, on the first communication device, that the access code to the secured website is stored in the authentication server after having stored this access code, in order to inform the user that he can access this secured website in a secured manner.

In an embodiment of the present invention, the method further comprises an initialisation step which comprises:

sending a request for generating the security code to the second communication device using contact data identifying the second communication device, this contact data being input using the secure access module, and generating the security code on the second communication device.

In another embodiment of the present invention, the method further comprises an initialisation step which comprises the installation of a secure access module on the first communication device, said secure access module being configured to perform at least one of the above-mentioned detection, indication and forwarding steps.

In a particularly advantageous implementation of this embodiment, the secure access module is a plug-in module configured to be installed in a web browser interface of the first communication device.

The present invention also proposes an authentication server for granting access to a secured website of a content provider, this authentication server comprising a storage unit for storing at least one access code for accessing said secured website and a communication unit able to receive a request for said access code from a first communication device, wherein the communication unit is configured to send a request for a validation to a second communication device and to send the stored access code to the first communication device after verification of the validation received from the second communication device. In an embodiment of the present invention, the validation can be obtained by requesting a security code to the second communication device.

The present invention further proposes a communication device for granting access to a secured website of a content provider, this communication device comprising a processing unit comprising a secure access module able to detect a user's request for accessing this secured website, this request indicating that at least one access code for accessing this secured website is stored on an authentication server, and a communication unit able to receive the access code from the authentication server, wherein the communication unit is configured to send a request for the access code to the authentication server after detection of the request for accessing the secured website by the processing unit and to forward the request for accessing the secured website to the content provider using the access code received from the authentication server.

The present invention also proposes a system for granting access to a secured website of a content provider, this system comprising the above-described authentication server, the above-described communication device and a second communication device able to receive a request for a validation from the authentication server and, in response to said request, to send the validation to the authentication server.

In an advantageous embodiment, the authentication server of the system is hosted in a telecom operator network system, the first communication device is a personal computer and the second communication device is a mobile phone terminal. In such an embodiment, the management and retrieval processes of the user's access codes can be secured by the telecom operator itself.

The present invention further proposes a computer program product comprising instruction codes adapted to perform the above-mentioned steps which are carried out on a first communication device, when loaded and run on processing means of a first communication device.

In particular, the present invention proposes a computer program product comprising instruction codes adapted to perform the following steps, when loaded and run on processing means of a first communication device:

detecting a user's request for accessing a secured website provided by a content provider, this request indicating that at least one access code for accessing said secured website is stored on an authentication server;

generating a request for said access code intended to the authentication server;

forwarding the user's request for accessing the secured website to the content provider using the access code received from the authentication server.

The present invention also proposes a computer program product comprising instruction codes adapted to perform the above-mentioned steps which are carried out on an authentication server, when loaded and run on processing means of an authentication server.

In particular, the present invention proposes a computer program comprising instruction codes adapted to perform the following steps, when loaded and run on processing means of an authentication server:

after reception, from a first communication device, of a request for at least one access code for a secured website stored in the authentication server, generating a request for a validation intended to a second communication device;

after reception of the validation from the second communication device, retrieving said access code in the authentication server and forwarding said access code to the first communication device.

Validation could be implemented for example by requesting a security code or an acknowledgement by the user.

BRIEF DESCRIPTION OF THE DRAWINGS

Other features and advantages of the invention will become apparent from the following description of non-limiting exemplary embodiments, with reference to the appended drawings, in which:

FIG. 2 illustrates the steps of a method for granting access to a secured website according to the present invention.

DETAILED DESCRIPTION OF THE INVENTION

Figure 1:
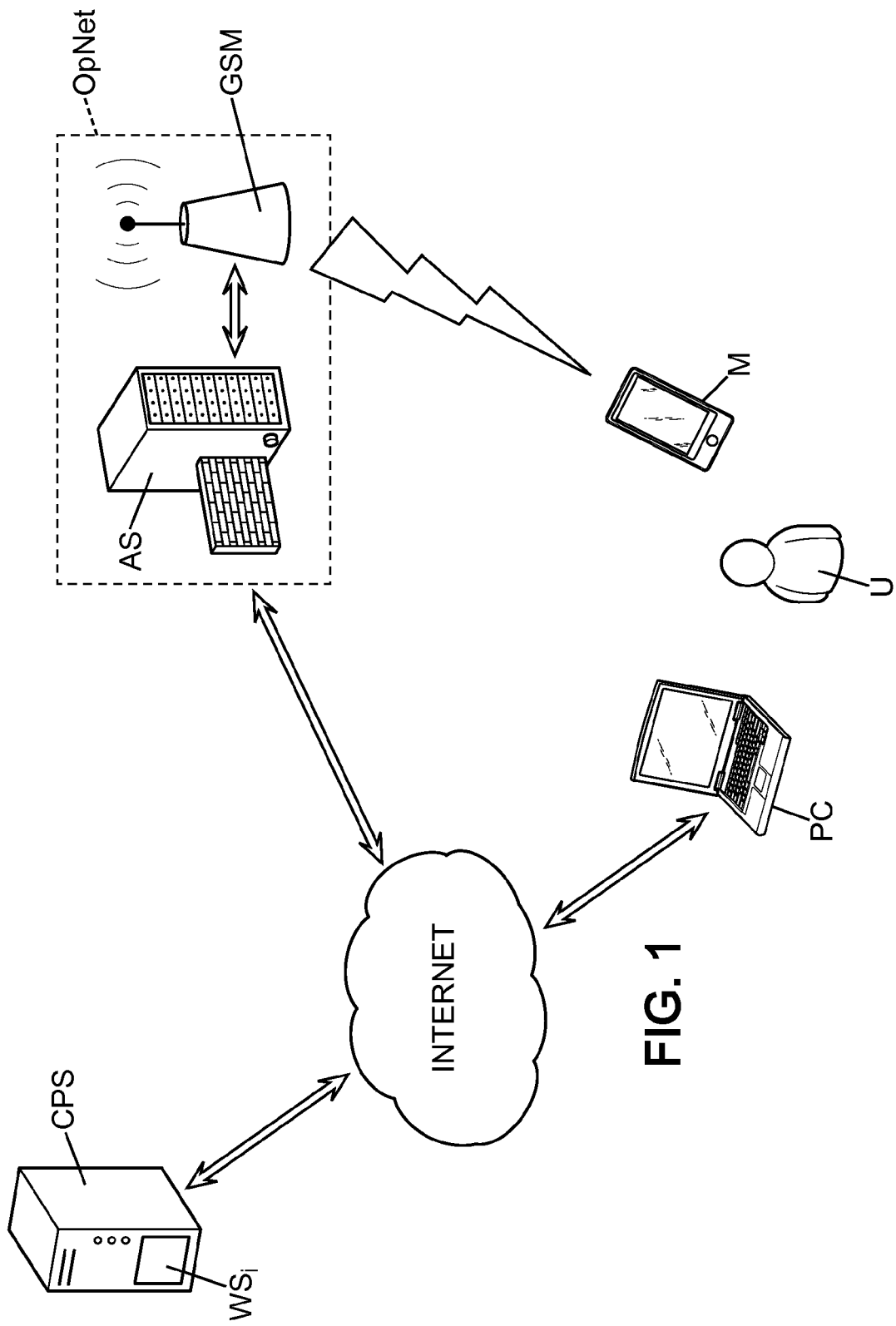
FIG. 1 illustrates a system for granting access to a secured website according to the present invention.

Next some embodiments of the present invention are described in more detail with reference to the attached figures.

FIG. 1 illustrates a system for granting access to a secured website according to the present invention.

This system is used by a user U who wants to access a secured website $WS_i$ provided by a remote content provider CPS via the internet. To that purpose, the system for granting this access involves an authentication server AS, a first communication device PC and a second communication device M.

The authentication server AS comprises typically a storage unit (such as memory means consisting of a hard disk or any other type of suitable digital memorization means) for storing one or more access code(s) for accessing the secured website $WS_i$. Such a storage unit can naturally store a plurality of access codes associated respectively with a plurality of secured websites $WS_1, \ldots, WS_1, \ldots, WS_n$.

The authentication server AS comprises also a communication unit able to receive, from the first communication device PC, a request for obtaining one or more access code(s) associated with a specific secured website $WS_i$, which are stored on the authentication server.

This communication unit is further configured to send a request for a validation to the second communication device M, after having been requested to provide access code(s) by the first communication device PC, and to send the requested access code to the first communication device PC after reception and verification of the validation from the second communication device M.

Validation could be implemented by requesting a security code from the second device. In this case, the authentication server AS may comprise also processing means for checking the validity of the security code received from the second communication device M, for instance for comparing this security code with a security code associated beforehand with the user.

Thus, in the present invention, the function of the authentication server is to store the user's access codes (in other words his credentials) in a remote and secure centralized location, for instance in protected premises under the supervision of a telecom operator designated here by OpNet, and to provide these access codes to the first communication device PC only when authentication with a proper validation is performed using a second communication device.

Another function of the authentication server is to manage an authentication request of the user via the second communication device M, by requesting and verifying a validation:

This validation can be implemented by requesting security code which is known only by the second communication device user, or This validation can also be implemented by only requesting an acknowledgement of the user on second communication device; this acknowledgement could be a choice between "OK" or "Ignore", a SMS message to sent back with "ok", or even just an empty SMS.

In all cases, the Authentication Server AS will verify the validation, either by:
- verifying the security code provided, or,
- verifying that the received SMS contains "OK" or
- verifying that the request received is a SMS sent from second device as an answer.

In case of communication between Authentication Server AS and second device by SMS, different requests could be identified by unique sequence ID.

Requests to second device could integrate interesting information for the user as for example secured web site that first device is willing to access.

The first communication device PC, typically a personal computer, comprises a processing unit and a communication unit.

The processing unit of the first communication device comprises a secure access module able to detect a user's request for accessing the secured website $WS_i$, this request indicating that one or more access code(s) $cred_i$ for accessing this secured website is stored on the authentication server AS. Such a secure access module is typically implemented by way of a web browser plug-in module when a web browser interface is provided on the first communication device;

The communication unit of the first communication device is configured to send a request for these access code(s) to the authentication server AS after detection of a user's request for accessing the secured website WS by the processing unit.

The communication unit is further able to receive, in return, the access code(s) from the authentication server AS and is also configured to forward the user's request for accessing the secured website to the content provider using the access code received from the authentication server.

Therefore, in the present invention, the function of the first communication device PC is to grant access to the secured website $WS_i$ to the user in a user-friendly way, without storing locally the access codes for this secured website $WS_i$ on this first communication device, in order to avoid potential trouble when this first communication device is hacked.

To that end, the first communication device PC, on which a secure access module such as web browser plug-in may be installed to facilitate such an implementation, is designed to capture the user's credentials, send these user's credentials to the centralized authentication server AS and invoke the logging request into a secured website $WS_i$.

This plug-in module can scan the website $WS_i$ in order to analyze the attributes of the source code and intercepts the URL of the website as well as the access codes of the user, such as his login and password identifiers, thus enabling, with the agreement of the user, the capture and storage of his/her credentials in the remote authentication server AS.

Such a web browser plug-in module, for instance developed in JavaScript and/or XPCOM components, can be based on Gecko and communicates in a secure way with the authentication server AS.

The website access code of the user will be stored and provided based on an URL interception and analysis by the plug-in. Thus, this mechanism will provide a defense against phishing tentative as masqueraded website will have a different URL as the real website: access code will not be provided by the present invention to masqueraded websites.

The second communication device M comprises also a processing unit and a communication unit.

The communication unit of the second communication device is able to receive a request for a validation from the authentication server AS and to send back to the authentication server AS, in return, the verification of the validation input by the user. This validation can be implemented by requesting a security code (such as a PIN code) that will be sent back to the authentication server and verified to obtain the validation.

This validation mechanism with a security code can be done:
- once for the second communication device, followed for instance by acknowledgement only (for example "OK" as mentioned before) or;
- repeated every time it is necessary to obtain validation, according to the level of security that is sought.

It can be possible to modify implementation by limiting in time and/or space (using GPS information for example) the duration of validity of one validation. To implement this validation with a security code, the processing means are configured to generate a pin code $PIN_U$ associated to the user in an initial phase, after receiving a request for generating such a pin code $PIN_U$, for instance by displaying such a request on a display unit of the mobile phone terminal and inviting the user to input himself this pin code $PIN_U$. Additionally, after receiving the request for a security code, the processing means are configured to generate an invitation to insert a security code, to be displayed on a display unit of the mobile phone terminal.

Thus, in the present invention, the function of the second communication device M is to interact with the authentication server AS in order to authenticate the user via this second communication device when requesting access code have been requested from a first communication device.

The second communication device M is typically a mobile phone terminal which can communicate with the authentication server AS via a mobile network controlled by the telecom operator OpNet. Such a mobile phone terminal can comprise an identification module having a SIM card which embeds a light SIMtoolkit based application. Such an application may be used to simplify the user's validation process and/or displaying the authentication request. Such a SIM card application may include the capability to be updated Over The Air (OTA), to improve the flexibility of the system.

Consequently, in the system as shown in FIG. 1, the user's first communication device PC does not store any credential, but all users' credentials are stored in the authentication server AS acting as a centralized repository, managed advantageously by a Telecom Operator. Besides, the secured websites $WS_i$ are not required to be readapted in order to make them compliant with the present invention.

The present invention may also be implemented using the authentication server as a proxy server for first communication device; in this case, all communication between first communication device and secured website of a content provider will go through the authentication server.

In this implementation, the secure access module (which can be a plug-in installed in user's web browser) is integrated to the Authentication Server AS. Modification in the first device will be thus limited to indicating to the web browser that a proxy server should be used, and that this proxy server will be the Authentication Server AS. Obviously, the Authentication Server AS should integrate proxy functions. The invention can be seen in this case as a new functionality for a proxy server.

FIG. 2 illustrates the steps of a method for granting access to a secured website according to the present invention, using a security code on second device as a method to obtain validation and asking for validation for all access code requests.

This method can be divided into three main phases: an initialization phase 100, a credential memorization phase 200 and a secured access granting phase 300.

The initialization phase 100 starts with the installation (step 110) of a secure access module on the first communication device PC. Such a secure access module can be downloaded from a dedicated website, for instance owned by the telecom operator OpNet managing the authentication server. In an embodiment where the first communication device is a personal computer, with a web browser installed on it, this secure access module can consist of a plug-in module compatible with this web browser. Such a web browser plug-in module can be automatically installed in web browser, simply by opening an installation file stored on a local disk or by downloading it from the Internet.

An input step 120 then follows, where the user U is invited by the secure access module to log in on the first communication device and enter contact data $id_M$ identifying the second communication device. In an embodiment where this second communication device is a mobile terminal, such contact data $id_M$ may comprise a valid mobile phone number. At that stage, the user U may also be invited to input his personal data $d_U$.

Once input, the contact data $id_M$ and the user's personal data $d_U$ are sent (transmission step 125) to the authentication server AS where they can be stored. Such a transmission between the first communication device PC and the authentication server AS can performed with a secure protocol such as HTTPS, for instance.

Upon reception of these data, the authentication server generates (130) a request (designated by $PIN_{gen}$) for a security code, for instance a PIN code when the second communication device M is a mobile phone, and sends (transmission step 135) this request $PIN_{gen}$ to the second communication device using the contact data $id_M$ (i.e. using the mobile phone number identified by such contact data when the second communication device is a mobile phone).

The second communication device M then generates (140) the security code $PIN_U$ associated with the user U (for instance by inviting the user U to input such a security code), such security code $PIN_U$ being usable for managing the access codes stored in authentication server AS, as explained hereafter.

Once generated, the security code $PIN_U$ is transmitted back (step 145) to the authentication server AS, where it is stored for future use, possibly associated with personal data $d_U$ identifying the user.

The data transmission (steps 135 and 145) between the authentication server AS and the second communication device M can be performed with specific methods associated with mobile networks, such as OTA, binary SMS, WAP push, etc.

Once the initialization is finished, a secure access module is readily installed on the first communicating device and a user-defined security code is stored in the authentication server AS.

A credential memorization phase 200 follows the initialization phase 100. Such a credential memorization phase can occur every time the user U tries to access for the first time a secured website $WS_1, \ldots, WS_i$ requesting one or more access code(s) via the first communication device PC.

To that end, the credential memorization phase 200 comprises the detection (step 210) of one or more access code(s), on the first communication device PC, when the user requests for the first time to access a secured website $WS_i$ provided by a content provider CPS.

With the first communication device PC being a personal computer providing the user with a web browser for accessing the secured website $WS_i$ on internet, this detection step can be implemented by using a web browser plug-in which is adapted to learn the access code(s) (designated by $cred_i$) the first time the user enters this secured website $WS_i$ and to fill in the access code(s) fields of this website. Typically, such access codes can comprise a user login (to identify the user) and a password (to authenticate the user).

Following the access code(s) detection 210, the detected access code(s) $cred_i$ are transmitted (step 215) to the authentication server AS where they are stored (step 220) securely in storage means pertaining to this authentication server AS.

Such a credential memorization operation can be performed for each secured website $WS_i$ for which the user requests the access for the first time, thereby providing the authentication server AS with a plurality of access code(s) $cred_i$ associated respectively with a plurality of secured website $WS_i$. The storage means of the authentication server AS can thus keep track of a table associated to user U, where a list of secured website $WS_i$ are associated respectively to one or more access code(s) $cred_i$.

Here, the user has the possibility to delete or modify one or more of his access code(s) stored in the authentication server AS, for instance via a web browser plug-in module installed on the first communication device PC. Such a plug-in module can also be used to modify the security code $PIN_U$ associated to this user.

Once the access code(s) $cred_i$ are stored in the authentication server AS, the first communication device PC can indicate to the user that the secured website is in a "ready state" where further accesses can be granted via a second communication device and do not need the re-entry of the access code(s) on the first communication device.

Such a "ready state" can be indicated by a plug-in state icon shown on the screen of the first communication device, for informing the user if the secured website whose access is requested is in such a "ready state" or not.

Such "ready state" icon can also provide some protection against phishing as masqueraded website will not appear in "ready state", allowing the user to distinguish the masqueraded website from the trustworthy website.

Once the user has requested access to the secured website $WS_i$ for the first time, and thus once his/her access code(s) regarding this secured website $WS_i$ are stored securely in the authentication server AS, a secured access granting phase 300 can take place.

This secured access granting phase is triggered by the detection (step 310) of a user's request for accessing this secured website $WS_i$ on the first communication device PC, wherein this request indicates that one or more access code(s) $cred_i$ for accessing said secured website is already stored on the authentication server AS.

In other words, there is a detection process, carried out on the first communication device PC, for detecting when the user tries to access a secured website $WS_i$, for which access code(s) $cred_i$ are already stored on the authentication server AS, i.e. for the second or further time.

In the embodiment where a plug-in icon indicates a "ready state" of the secured website on the first communication device PC, the user's request for accessing this secured website can simply consist in clicking on this plug-in icon, therefore providing a simple way to detect a user's request indicating that access code(s) are already stored in the authentication server AS.

Once a user's request for accessing the secured website $WS_i$ for which access code(s) are stored in authentication server AS has been detected on the first communication device PC, a request for obtaining these access code(s) (designated by req_cred$_i$), typically generated by the plug-in module installed on the first communication device, is sent (step 315) to the authentication server.

After receiving such a request req_cred$_i$, the authentication server AS triggers a process for authenticating the user U via a second communication device M, different from the first communication device PC, before communicating the request access code(s) to the first communication device PC, in order to increase the safety of the access granting process.

To that end, the authentication server AS generates (step 320) a request for a security code (designated by req_PIN) and sends this request req_PIN (step 325) to the second communication device M. In an embodiment where the second communication device M is a mobile phone terminal, this request req_PIN can be sent as binary SMS or OTA message, or via a WAP push process.

After receiving such a request req_PIN, the second communication device M invites (step 330) the user U to enter his security code PIN$_U$, in other words his personal authentication code. This invitation step can be implemented by displaying a specific interface for inputting a security code on the second communication device, or simply by displaying a message (such as a SMS message corresponding to the request req_PIN) requesting the user to respond (for instance with a SMS response message) and insert his security code in his response.

The input security code PIN is then transmitted back (step 335) to the authentication server AS where it is compared (during a verification step 340) with the security code PIN$_U$ which has been associated with the user U during the initialization phase 100:

If the input security code PIN does not correspond to the security code PIN$_U$ of the user, the access code(s) cred$_i$ are not transmitted to the first communication device PC. The granting access process can proceed further by performing again, a limited number of times, the security code request process of steps 320-335 or by terminating the access granting process and triggering an alert, for instance to the first communication device PC, indicating that someone tries to obtain access codes with a wrong security code.

If the input security code PIN corresponds to the security code PIN$_U$ of the user, this user U is authenticated by the authentication server AS and the access code(s) requested with the request req_cred$_i$ are transmitted (step 345) to the first communication device M where they can be used to proceed further with the access to the secured website.

Once the access code(s) cred$_i$ have been received by the first communication device PC, the user's request for accessing the secured website WS$_i$ can be updated and completed (step 350) with these access code(s) and forwarded (step 355) to the content provider in order to obtain the access to this secured website.

The user's request update and completion step 350 is advantageously performed automatically, for instance by the above-mentioned plug-in module, to minimize the interactions with the user U and increase the ergonomics of the whole process.

For instance, when the user's request is implemented via an access webpage, which is displayed using a web browser and provides specific security field(s) for inputting access code(s) (for instance login and password fields), the plug-in module can fill in automatically these security fields with the received access code(s). The completed access webpage can then be forwarded, either automatically after having filled in the security fields or after confirmation by the user, to the content provider CPS via internet.

FIG. 2 process could be simplified by modifying steps 320, 325, 330 335 and 340 at the price of lowering the security offered by the present invention. Instead of requesting a security code, the Authentication Server AS could only request a validation such as "OK" or "not OK", and after verification by the Authentication Server AS of this validation, allows access code to be forwarded or not to the first device.

This method of granting access to secure websites offers the following advantages:

users' credentials are securely stored in an authentication servers, for instance provided by a Mobile Network Operator System, and protected with the same safe mechanisms as customer's personal information;

no personal information or access code is stored locally on any communication devices: users only have to enter a security code on a communication device for retrieving the needed access codes. This makes the access granting system more secure for multi-user utilization and allows using safely this method on public computers;

when using security code request on second device, the security offered by the present secure access granting method is increased, when compared to solutions involving only credentials, as it is based on two key elements (strong authentication): an element that only the user should know (a security code such as a personal PIN code) and an element that only the user should have (a second communication device such as a mobile phone);

the use of a simple web browser plug-in module allows secure communication between a first communication device such as the user's personal computer, an authentication server providing the credential store data base and a second communication device such as the user's mobile phone;

A single security code such as a PIN code can be used to manage all the user's credentials.

The present invention relates further to a computer program product comprising instruction codes adapted to perform at least one of the above-mentioned detection steps 210, 310, updating step 350 and forwarding step 355, when loaded and run on processing means of the first communication device PC:

The present invention also relates to a computer program product comprising instruction codes adapted to perform at least one of the above-mentioned initial pin request generation, authentication request 320, verification 340 and access code retrieval 342, when loaded and run on processing means of the authentication server AS.

These computer programs may be stored or distributed on a suitable medium supplied together with or as a part of other hardware, but may also be distributed in other forms, such as via the Internet or other wired or wireless telecommunication systems.

While the invention has been illustrated and described in detail in the drawings and foregoing description, such illustration and description are to be considered illustrative or exemplary and not restrictive, the invention being not restricted to the disclosed embodiments. Other variations to the disclosed embodiments can be understood and effected by those skilled in the art in practicing the claimed invention, from a study of the drawings, the disclosure and the appended claims.

For the sake of illustrating the present invention, a single user U, a single content provider CPS and a single authentication server AS have been described in the aforementioned description of the method and system for granting access to a secured website.

However, the present invention is not limited to this case and it is naturally obvious that any number of users, content providers and authentication servers can be involved in the system described in the present description in order to carry out the present invention.

Besides, the method described in FIG. 2 has been explained with reference to the secure access of a single secured website $WS_i$. However, a plurality of secured website $WS_i$ can be accessed similarly during the secured access granting phase 300.

To that end, a web browser session can be implemented on the first communication device. With such a web browser session, when the user opens the web browser, he/she can clicks on the dedicated plug-in to start an authentication process as explained in FIG. 2, involving the insertion of the security code $PIN_U$, and as long as the browser is open, the plug-in module will automatically login in all the secured websites for which access codes have been previously learned.

The present invention is particularly advantageous when carried out according to the two following application modes:
  a "personal service" mode, providing multipurpose user credentials management and authentication to access websites. In such a mode, a single security code, such as a user's PIN code, can be used for manage multiple user credentials;
  a "professional service" mode, providing a secure method for employee's authentication into corporate sites, by linking the user's identity with his/her phone number.

An embodiment of the present invention overcomes proposes a solution with a high level of security which avoids storing locally user's credentials while not requiring complex modifications of the websites or the user's computers to be implemented, such a solution being easily implementable on mobile network operator systems and standard SIM cards.

The invention claimed is:

1. A method for granting access to a plurality of secured websites of a plurality of content providers, said method comprising:
  detecting a user's first request on a first communication device for accessing a first secured website among the plurality of secured websites, of a first content provider among the plurality of content providers, said first request indicating a first access code for accessing said first secured website is stored on an authentication server;
  sending a first request to obtain the first access code from the first communication device to the authentication server, in response to detection of the user's first request for accessing said first secured website;
  in response to the user's first request, sending a first request for a first validation from the authentication server to a second user communication device of the user associated with the first request;
  after verification of a first validation received from the second user communication device by the authentication server, receiving by the first communication device the stored first access code corresponding to the first validation from the authentication server and forwarding the first request for access to the first secured website from the first communication device to the first content provider using the received first access code;
  detecting a user's second request on the first communication device for accessing a second secured website among the plurality of secured websites, of a second content provider among the plurality of content providers, said second request indicating a second access code for accessing said second secured website is stored on the authentication server;
  sending a second request to obtain the second access code from the second communication device to the authentication server, in response to detection of the user's second request for accessing said second secured website;
  in response to the user's second request, sending a second request for a second validation from the authentication server to the second user communication device; and
  after verification of a second validation received from the second user communication device by the authentication server, receiving by the first communication device the stored second access code corresponding to the second validation from the authentication server and forwarding the second request for access to the second secured website from the first communication device to the second content provider using the received second access code.

2. The method for granting access according to claim 1, wherein the first validation is a security code.

3. The method for granting access according to claim 1, wherein the first validation is an acknowledgment.

4. The method for granting access according to claim 1, wherein said method further comprises:
  detecting said first access code on the first communication device when the user requests for the first time to access said first secured website; and
  storing said first access code on the authentication server.

5. The method for granting access according to claim 4, wherein said method further comprises indicating, on the first communication device, that the first access code to the secured website is stored in the authentication server after having stored said first access code.

6. The method for granting access according to claim 1, further comprising an initialization step which comprises:
  receiving by the authentication server, from the first communication device, contact data identifying the second user communication device, said contact data being input using a secure access module installed on the first communication device;
  sending a request for generating the first validation from the authentication server to the second user communication device using the contact data;
  generating the first validation on the second user communication device.

7. The method for granting access according to claim 1, wherein said method further comprises an initialization step which comprises installation of a secure access module on the first communication device, said secure access module being configured to perform at least one of the detection, indication and forwarding steps.

8. The method for granting access according to claim 7, wherein the secure access module is a plug-in module configured to be installed in a web browser interface of the first communication device.

9. The method of claim 1, wherein the first and second validations are the same.

10. A user communication device for granting access to a plurality of secured websites of a plurality of content providers, said user communication device comprising:
  a processing unit, of the user communication device, comprising a secure access module configured to detect a user's first and second requests for accessing respectively first and second secured websites of said plurality of secured websites, said first and second requests indicating that first and second access codes for accessing said first and second secured websites are stored on an authentication server;

a communication unit, of the user communication device, configured to send respective first and second requests for said first and second access codes to the authentication server after detection of said respective first and second requests by the processing unit, to receive said first and second access codes from the authentication server, and to forward the first and second requests for accessing the respective first and second secured websites to the respective content providers of the first and second secured websites using the first and second access codes received from the authentication server.

11. A system for granting access to a plurality of secured websites of a plurality of content providers, said system comprising:

an authentication server comprising:
a storage device configured to store first and second access codes for accessing first and second of said plurality of secured websites; and
a communication unit configured to receive a user's first and second requests for said respective first and second access codes from a first communication device, to send respective first and second requests for validation to a second user communication device associated with the user, and to send the respective first and second stored access codes to the first user communication device after respective verifications of respective first and second validations received from the second user communication device;

the first communication device, which comprises:
a processing unit comprising a secure access module configured to detect the user's first and second requests for accessing said first and second secured websites, said first and second requests respectively indicating that the first and second access codes for accessing said first and second secured websites are stored on the authentication server;
a communication unit configured to send the first and second requests for said first and second access codes to the authentication server after respective detection of said first and second requests for accessing the first and second secured websites by the processing unit, to receive said first and second access codes from the authentication server, and to forward the respective first and second requests for accessing the first and second secured websites to respective content providers using the respective first and second access codes received from the authentication server; and the second user communication device, which is configured to receive the first and second requests for validation from the authentication server and, in response to each of said first and second requests for validation, to send respectively the first and second validations to the authentication server.

12. The system according to claim 11 wherein the first validation is a security code.

13. The system according to claim 11, wherein the authentication server is hosted in a telecom operator network system, the first communication device is a personal computer and the second user communication device is a mobile phone terminal.

* * * * *